US010799821B2

(12) United States Patent
Ackermann et al.

(10) Patent No.: US 10,799,821 B2
(45) Date of Patent: Oct. 13, 2020

(54) AIR FILTER WITH MINIMAL PRESSURE LOSS

(71) Applicant: MANN+HUMMEL GmbH, Ludwigsburg (DE)

(72) Inventors: Steffen Ackermann, Harthausen (DE); Andrew Glynn, Bad Schoenborn (DE); Dennis Stark, Mauer (DE); Suresh Aragbatagangapa Eswarapa, Bangalore (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 251 days.

(21) Appl. No.: 15/958,062

(22) Filed: Apr. 20, 2018

(65) Prior Publication Data

US 2018/0304183 A1    Oct. 25, 2018

(30) Foreign Application Priority Data

Apr. 21, 2017   (DE) .......................... 10 2017 003874

(51) Int. Cl.
*B01D 46/24*   (2006.01)
*B01D 35/30*   (2006.01)
(Continued)

(52) U.S. Cl.
CPC ......... *B01D 46/0005* (2013.01); *B01D 35/30* (2013.01); *B01D 46/24* (2013.01);
(Continued)

(58) Field of Classification Search
CPC .... B01D 46/0005; B01D 35/30; B01D 46/24; B01D 46/521; B01D 46/2403; B01D 2279/60; F02M 35/02416; F02M 35/02433; F02M 35/0204; F02M 35/0201; F02M 35/02483; F02M 35/0209
(Continued)

(56) References Cited

U.S. PATENT DOCUMENTS

| 6,416,561 | B1 * | 7/2002  | Kallsen  | B01D 29/21 55/482 |
| 8,202,341 | B2 * | 6/2012  | Becker   | B01D 45/06 210/493.2 |
| 8,419,834 | B2 * | 4/2013  | Rotter   | B01D 46/0004 123/198 E |
| 10,434,453 | B2 * | 10/2019 | Jakop    | B01D 46/2414 |
| 2002/0040569 | A1 | 4/2002 | Reinhold | |

(Continued)

FOREIGN PATENT DOCUMENTS

WO    WO2006119414 A1    11/2006

*Primary Examiner* — Minh Chau T Pham
(74) *Attorney, Agent, or Firm* — James Hasselbeck

(57) ABSTRACT

An air filter has a round housing that is coaxial to a central axis of the air filter. The housing has a housing bottom part and a detachable housing cover. A round filter element is received in the housing. The housing bottom part has a tubular housing wall with an open end and an outlet-side axial end provided with a central outlet socket positioned axially opposite to the open end. Through the outlet socket, air exits from the air filter after filtration. The housing cover closes off the open end. A raw air region with annular cross section is formed between round filter element and inner side of the tubular housing wall. The housing cover has an annular or ring section-shaped air inlet region with inflow openings through which air to be filtered enters the housing without deflection in a direction coaxially or parallel to the central axis.

17 Claims, 2 Drawing Sheets

(51) Int. Cl.
  *B01D 46/00* (2006.01)
  *F02M 35/024* (2006.01)
  *F02M 35/02* (2006.01)
  *B01D 46/52* (2006.01)

(52) U.S. Cl.
  CPC ....... *B01D 46/2403* (2013.01); *B01D 46/521* (2013.01); *F02M 35/0201* (2013.01); *F02M 35/0204* (2013.01); *F02M 35/02416* (2013.01); *F02M 35/02433* (2013.01); *F02M 35/02483* (2013.01); *B01D 2279/60* (2013.01)

(58) Field of Classification Search
  USPC ...... 55/385.3, 337, 410, 414, 503, 498, 502, 55/DIG. 28; 95/268, 273; 123/198 E
  See application file for complete search history.

(56) References Cited

U.S. PATENT DOCUMENTS

| | | | |
|---|---|---|---|
| 2009/0019823 A1* | 1/2009 | Juliar | B01D 46/0004 55/472 |
| 2009/0145095 A1* | 6/2009 | Juliar | B01D 46/0046 55/359 |
| 2009/0266040 A1* | 10/2009 | Schramm | B01D 46/10 55/385.3 |
| 2010/0229511 A1* | 9/2010 | Steins | B01D 46/0046 55/337 |
| 2014/0109532 A1* | 4/2014 | Kaufmann | F02M 35/02433 55/428 |
| 2014/0373495 A1 | 12/2014 | Madeira et al. | |

\* cited by examiner

AIR FILTER WITH MINIMAL PRESSURE LOSS

TECHNICAL FIELD

The invention concerns an air filter, in particular for the intake air of compressors or internal combustion engines.

BACKGROUND

EP 2 851 111 A1 discloses a so-called two-stage air filter. The latter comprises a round main filter element, optionally a secondary filter element arranged therein, and a pre-separator arrangement that comprises a tangentially arranged inflow socket for generating a rotating flow. The pre-separators always cause a certain additional pressure loss in operation of the two-stage filter compared to a single-stage air filter. In single-stage air filters, since no pre-separation is desired, the intake socket which is arranged tangentially in a two-stage air filter is replaced by a radially arranged inflow socket in the cylindrical housing wall, as shown, for example, in EP 2 765 298 A1. The inflow sockets however require an additional installation space around the cylinder shape of the round filter housing and require flow deflections along the path to the filter element.

SUMMARY OF THE INVENTION

It is an object of the invention to provide a single-stage air filter with minimal pressure loss.

The object is solved by an air filter of the aforementioned kind in that the housing cover comprises an annular or ring section-shaped air inlet region with at least one inflow opening through which the air can enter the housing, in particular the housing bottom part, without deflection coaxially or parallel to the central axis.

The dependent claims as well as the following description provide advantageous further embodiments.

The air filter according to the invention comprises a round, preferably circular, housing that is coaxial relative to a central axis, with a preferably cup-shaped housing bottom part and a detachable housing cover as well as a round filter element received in the housing, wherein the housing bottom part comprises a completely closed, tubular housing wall which comprises, at an outlet-side axial end, a central outlet socket through which the purified air can escape, wherein the housing cover closes off the open end of the housing bottom part which is positioned axially opposite to the outlet socket, wherein a raw air region with annular cross section is formed between the round filter element and the inner side of the housing wall. The housing cover comprises an annular or ring section-shaped air inlet region with one or more inflow openings through which the air can enter the raw air region of the housing, in particular of the housing bottom part, without deflection, in particular coaxial to the axis.

This has the advantage that the air can flow through the air filter without pressure loss-increasing deflections, for example, from the exterior to the interior in radial direction, from the interior to the exterior, or from a direction perpendicular to the axis in a direction parallel to the axis.

In this way, a single-stage air filter with minimal pressure loss can be provided according to the invention.

In a preferred further embodiment, it is provided that the air inlet region is arranged in the radial outer area of the housing cover, in particular radially outside of the circumference of a filter element received in the housing. In this way, the inflow can be realized directly into the raw air region.

In a preferred further embodiment, it is provided that the housing cover comprises a preferably round closed inner region and an also closed annular outer region which are connected to each other by in particular axis-parallel and radially extending flat webs between which the inflow openings are formed. In this way, the filter element can be held in a simple way and an annular air inlet region can be provided.

In a preferred further embodiment, it is provided that the air inlet region and the raw air region comprises cross sections which overlap in axial direction.

Preferably, in order to provide for the best possible inflow, the air inlet region and/or the inflow openings comprise in axial direction a prismatic shape that is preferably deflection-free in radial direction.

It is preferred in this context that the air inlet region does not project past the raw air region in radial outward direction and radial inward direction, i.e., viewed in axial direction, the cross section of the air inlet region lies completely within the cross section of the raw air region. In this way, a complete deflection-free inflow into the raw air region can take place wherein the flow, due to the annular shape of the air inlet region, is distributed uniformly about the round filter element so that no compensation flows are produced and a uniform loading of the filter element with dust is achieved.

In a preferred further embodiment, it is provided that the at least one inflow opening comprises a straight channel shape which is deflection-free and has a constant cross section in axial direction.

In a preferred embodiment, the air inlet region comprises and is delimited by a cover-associated outer tubular wall section and a cover-associated inner tubular wall section, wherein preferably both wall sections project into the housing bottom part. The inner tubular wall section surrounds in this context the cover-associated end of the filter element. In this way, by means of the inner wall section the filter element can be radially held and an annular flow channel that has a constant cross section can be formed which opens into the annular raw air region or, in other words, transitions into the latter.

Particularly preferred, the outer wall section projects into a cover-associated rim area of the open end of the housing bottom part. This cover-associated rim area of the open end of the housing bottom part is preferably widened in the region into which the outer wall section is projecting and the outer wall section projects into this widened region preferably in such a way that it extends the housing wall cylindrically without change in diameter, in particular without jump in diameter. In other words, the outer wall section extends as a continuation of the major part of the tubular housing wall in the region in which it is surrounded by the region of the housing wall that is widened locally only across a short section. Outer wall section and the housing wall form thus a tubular wall which is provided with a constant diameter. This has a positive effect for minimizing the pressure loss.

Preferably, the inflow openings are ring section-shaped, i.e., they have a cross section with an outer curve and an inner curve, in particular coaxial to each other, respectively. Preferably, the inflow openings also form the air inlet region. Further preferred, the inflow openings are in particular uniformly distributed about the circumference.

In a preferred further embodiment, it is provided that the inflow cross section that is formed in particular by the inflow openings is of the same size or larger than the outflow cross section of the outlet socket. In this way, a pressure loss upstream of the filter element can be minimized.

In a preferred further embodiment, it is provided that, viewed in axial direction, the inflow cross section comprises at least 50%, in particular at least 60%, particularly preferred at least 70%, of the cross section of the annular raw air region that is arranged between the filter element and the housing wall.

In a preferred further embodiment, it is provided that the at least one inflow opening is arranged axially at the level of a closed end disk of an inserted filter element.

In a preferred further embodiment, it is provided that the housing cover in the region of the inflow openings is in particular slanted in a cone shape or truncated cone shape. In this way, a pressure loss-optimized inlet region can be realized.

In a preferred further embodiment, it is provided that a filter element is received in the housing which is embodied without inflow protection element. In this way, an inflow that is as direct and uniform as possible is enabled.

DESCRIPTION OF PREFERRED EMBODIMENTS

Figure 1:
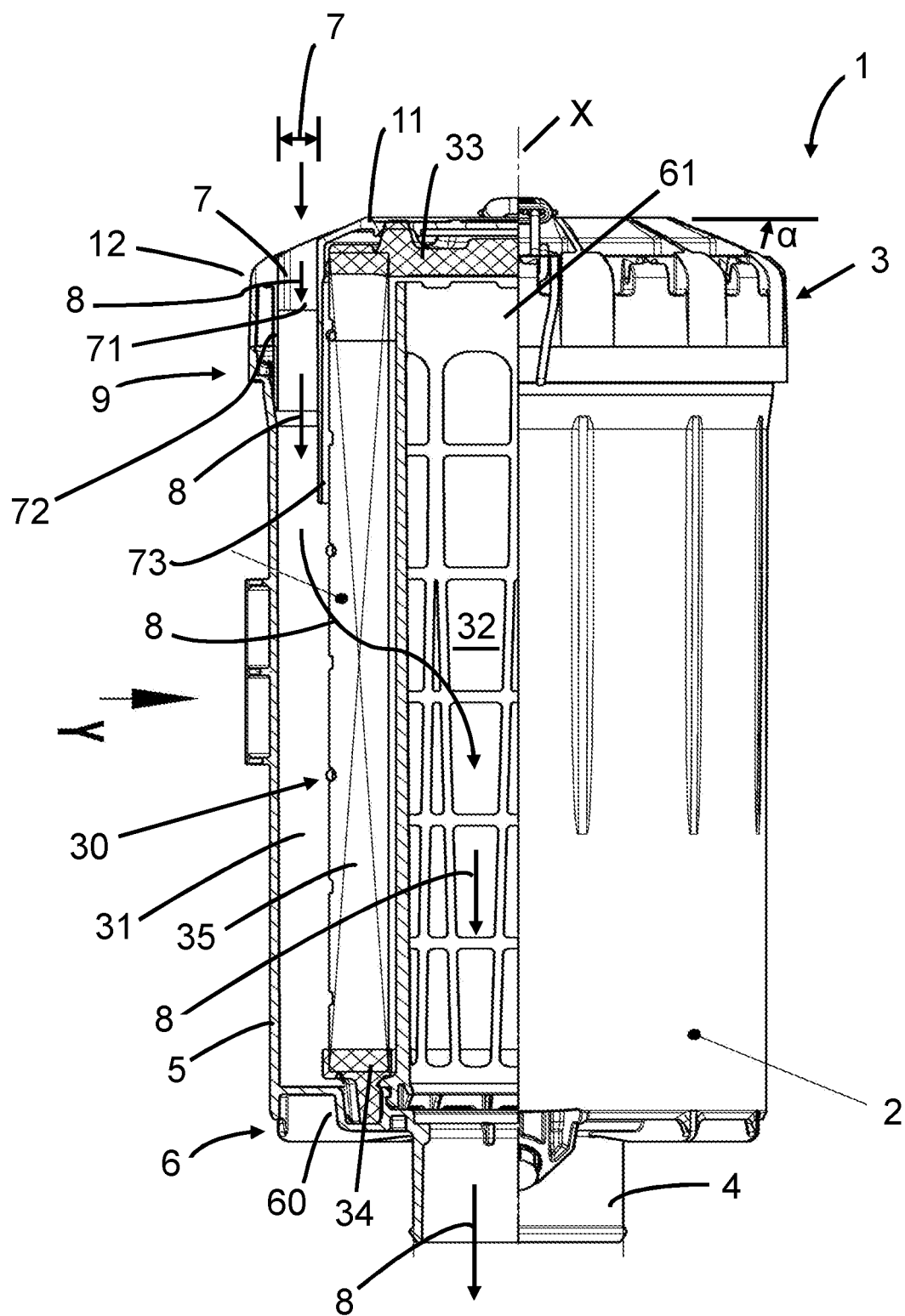
FIG. 1 shows an air filter in a partially sectioned view in longitudinal direction.
Figure 2:
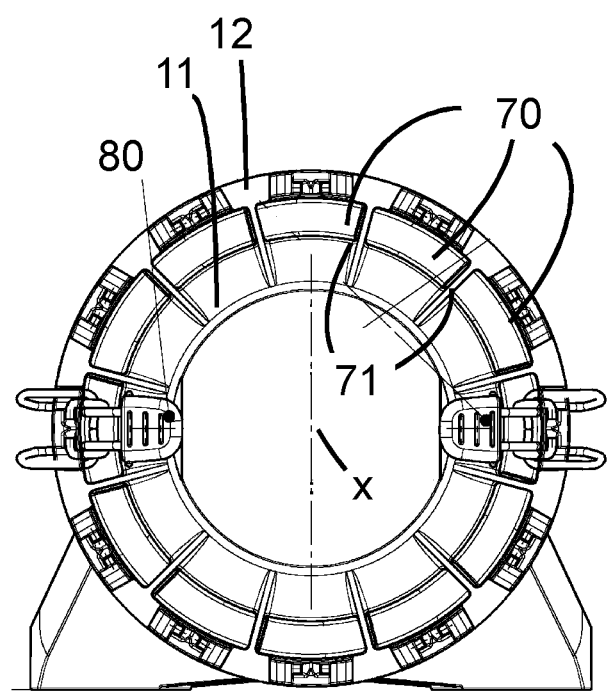
FIG. 2 shows the air filter of FIG. 1 in a plan view of the housing cover.

The Figures show an air filter 1, in particular for the intake air for internal combustion engines, comprising a round housing coaxial to a central axis X, with a housing bottom part 2 and a detachable housing cover 3, wherein the housing bottom part 2 comprises a completely closed tubular housing wall 5 which is closed off at an outflow-side axial end 6 by a closure wall 60 which is arranged perpendicular to the axis X and which comprises a central outlet socket 4 through which the purified air can escape.

The housing cover 3 closes off the open end 9 of the housing bottom part 2 which is positioned axially opposite the outlet socket 4 and comprises an annular or ring section-shaped air inlet region 7 through which the air can enter the housing, in particular the housing bottom part 2, without deflection coaxially to the axis X. The housing cover 3 can be fastened by at least two snap hooks 80 to the housing bottom part 2.

Preferably and generally, an exchangeable round filter element 30 is arranged in the housing (formed by housing bottom part 2 and housing cover 3) and comprises preferably an annular closed filter body 35, an outflow-side open end disk 34, and a closed end disk 33, wherein the air to be filtered passes from an annular raw air region 31 arranged between filter element 30 and housing wall 5 through the filter body 35 into the clean air region 32 in the interior of the filter element 30 with separation of particles. The air purified thereby exits subsequently from the outlet socket 4. The course of the air flow is indicated schematically by the arrows 8.

The filter body 35 is preferably a zigzag-shaped folded, annularly closed filter media bellows and is seal-tightly connected with the end disks 33, 34, in particular the end disks 33, 34 are made of cast polyurethane and surround, when cast, seal-tightly and with form fit the filter body 35. The filter body 35 is preferably embodied at its outer circumference without inflow protection element; this means that substantially the entire annular inflow surface, mostly defined by fold edges, is available for inflow and no areal support or flow guiding devices are arranged at the inflow surface. For radial support of the filter body in inward direction, a flow-permeable support grid pipe 61 is provided that is in particular fixed to the housing.

The annular air inlet region 7 is preferably of a circular annular shape and, further preferred, is arranged in the radial outer region of the housing cover 3. Preferably, the housing cover 3 comprises a (circular) round closed inner region 11 and an also closed annular outer region 12 which is connected with the open end 9 of the housing bottom part 2. The air inlet region 7 is arranged between the inner region 11 and the outer region 12 and is preferably formed by inflow openings 70 arranged annularly, in particular so as to extend completely circumferentially, which are delimited by the outer region 12, the inner region 11, and preferably two, in particular radially extending, preferably flat, preferably planar, webs 71, respectively, that extend in the direction of the axis X.

The inner region 11 comprises preferably substantially the same diameter as the filter element 30 and/or axially completely covers it, in particular its closed end disk. The air inlet region 7 is preferably designed such that it is arranged in axial extension of the raw air region 31 and substantially overlaps its cross section. In this way, the air can pass without great flow resistance axially without deflection and/or significant cross section change through the air inlet region 7 into the raw air region 31. Since the air inlet region 7 or the inflow openings 70 are arranged in an annular shape, in particular distributed uniformly, around the filter element 30, inflow into the filter element 30 is uniform about its circumference which minimizes the pressure loss and leads to a uniform distribution of the particles to be separated at the filter element 30.

The air inlet region 7 is preferably delimited relative to the outer region 12 by an in particular cover-associated outer tubular wall section 72 which extends in particular as a continuation of the housing wall 5 and/or comprises its diameter and, relative to the inner region 11, is preferably delimited by a cover-associated inner tubular wall section 73 which in particular surrounds an axial end of the filter element 30 and whose length can amount to between 5% and 50% of the axial length of the housing 2, 3. For example, in connection with the webs 71, the inflow openings 70 can have in this way preferably a straight channel shape that extends in axial direction deflection-free and with constant cross section. This contributes to a configuration with low pressure loss and can contribute, due to calming and homogenization of the flow in the raw air region 31, to a more uniform loading and thus longer service life of the filter element 30.

In order to achieve a pressure loss as minimal as possible, it is preferred to maximize the inflow cross section, viewed in axial direction that is provided by the air inlet region 7. It is preferred that the open inflow cross-section, which in axial direction is in particular without deflection and which in general is provided by the inflow openings 70, amounts to at least 50%, in particular at least 60%, particularly preferred at least 70%, of the cross section which the annular raw air region 31 arranged between filter element 30 and housing wall 5 comprises in axial direction. In order to further minimize the pressure loss, it is further preferred that the air inlet region 7 or the inflow cross section provided by the air inlet region 7 is primarily or completely arranged within an axial projection of the annular raw air region 31 arranged between filter element 30 and housing wall 5.

Moreover, it is preferred that the inflow cross section is embodied to have the same size or to be larger than the outflow cross section of the outlet socket 4, in particular is at least 25%, preferably at least 50% larger. In particular in order to obtain an optimum between installation space requirement and available volume of the raw air region 31, the inflow openings 70 are arranged axially at the level of the closed end disk 33, i.e., preferably axially in a region which is defined by the axial extension of the end disk (in particular without taking into consideration possibly existing, axially projecting support structures).

By an in particular spherical or conical slant of the housing cover 3 in the region of the inflow openings 70, an easier free inflow can be achieved, in particular into installation spaces in which an obstacle in axial direction is close to the housing cover 3. The cone angle α preferably amounts to at least 15°, preferably at least 20°, and preferably maximally 45°, particularly preferred maximally 30°.

While specific embodiments of the invention have been shown and described in detail to illustrate the inventive principles, it will be understood that the invention may be embodied otherwise without departing from such principles.

What is claimed is:

1. An air filter comprising:
   a round housing that is coaxial to a central axis of the air filter, the round housing comprising
      a housing bottom part having:
         a completely closed tubular outer housing wall completely closing around and coaxial to the central axis of the air filter, the completely closed tubular housing wall comprising:
            a first axial end which is an open end of the completely closed tubular housing wall; and
            an outlet-side axial end completely closed tubular housing wall at an axial end opposite to the open end, the outlet side axial end covered by a closure wall, the closure wall having a central outlet socket through which purified air can escape,
         wherein, as used herein, axial is a direction parallel to the central axis (x), and radial is a direction transverse to the central axis (x);
      a housing cover detachably connected to the housing bottom part and arranged on the open end of the completely closed tubular outer housing wall;
         wherein the housing cover closes off the open end;
      a round filter element having an annular filter body received in an interior of the round housing, the annular filter body having a radially outer flow surface for air flow to enter the round filter element, the radially outer flow surface facing and spaced radially from a radially inner side of the completely closed tubular outer housing wall,
   wherein the radial spacing of the radially outer flow surface to the radially inner side of the completely closed tubular outer housing wall forms an axially extending annular raw air flow region therebetween;
   wherein the housing cover further comprises:
      a round closed inner surface arranged in and closing a center portion of the housing cover;
      an annular air inlet region of the housing cover which circumferentially surrounds the round closed inner surface, the annular air inlet region having:
         a plurality of inflow openings which are circumferentially spaced apart in the annular air inlet region and circumferentially surrounding the round closed inner surface, the plurality of inflow openings aligned radially with the axially extending annular raw air flow region such that air to be filtered enters the plurality of inflow openings directly to the axially extending annular raw air flow region without deflection.

2. The air filter according to claim 1, wherein
the annular air inlet region is arranged radially outside of an outer circumference of the filter element.

3. The air filter according to claim 1, wherein
the round closed inner surface of the housing cover and the annular air inlet region of the housing cover are connected to each other by a plurality of webs,
wherein the plurality inflow openings are formed between and spaced apart by the webs.

4. The air filter according to claim 3, wherein
the webs project axially parallel to the central axis, extend radially, and are flat.

5. The air filter according to claim 1, wherein
a cross section of the annular air inlet region of the housing cover and a cross section of the axially extending annular raw air flow region overlap each other in the axial direction.

6. The air filter according to claim 1, wherein
the annular air inlet region and the plurality of inflow openings comprise
a prismatic shape in the axial direction.

7. The air filter according to claim 1, wherein
the annular air inlet region of the housing cover does not project outwardly and inwardly past the axially extending annular raw air flow region in a radial direction relative to the central axis.

8. The air filter according to claim 1, wherein
the plurality of inflow openings each comprise
a straight channel shape that extends in the axial direction without deflection and with a constant cross section.

9. The air filter according to claim 1, wherein
an interior surface of the housing cover forms
an outer tubular wall projecting axially inwardly from an interior side of the housing cover, and
an inner tubular wall projecting axially inwardly from an interior side of the housing cover and spaced apart radially inwardly from the outer tubular wall,
wherein the annular air inlet region is delimited by the inner and outer tubular walls of the housing cover.

10. The air filter according to claim 9, wherein
the inner and outer tubular walls of the housing cover project into the housing bottom part.

11. The air filter according to claim 1, wherein
an inflow cross section formed by the plurality of inflow openings is of the same size or is larger than an outflow cross section of the outlet socket.

12. The air filter according to claim 1, wherein,
viewed in the axial direction, an inflow cross section of the plurality of inflow openings comprises at least 50% of an annular cross section of the axially extending annular raw air flow region.

13. The air filter according to claim 1, wherein
the inflow cross section of the plurality of inflow openings comprises at least 60% of an annular cross section of the axially extending annular raw air flow region.

14. The air filter according to claim 1, wherein
the inflow cross section of the plurality of inflow openings comprises at least 70% of an annular cross section of the axially extending annular raw air flow region.

15. The air filter according to claim 1, wherein
the plurality of inflow openings are arranged axially at a level of a closed end disk of the filter element.

16. The air filter according to claim 1, wherein
the annular air inlet region having the plurality of inflow openings is slanted in a cone shape or truncated cone shape.

17. The air filter according to claim 1, wherein the round filter element is embodied without inflow protection element.

* * * * *